United States Patent [19]

Henton

[11] 3,999,995
[45] Dec. 28, 1976

[54] METHOD OF MAKING MOLDED BLOCKS
[75] Inventor: Paul V. Henton, St. Louis, Mo.
[73] Assignee: Emerson Electric Co., St. Louis, Mo.
[22] Filed: June 16, 1975
[21] Appl. No.: 586,867
[52] U.S. Cl. ............................. 106/40 R; 106/85
[51] Int. Cl.² ...................................... C04B 21/00
[58] Field of Search ........................... 106/85, 40 R
[56] References Cited
UNITED STATES PATENTS

| | | | |
|---|---|---|---|
| 3,167,439 | 1/1965 | Vukasovich et al. | 106/85 |
| 3,179,527 | 4/1965 | Vukasovich et al. | 106/85 |
| 3,885,978 | 5/1975 | Doi et al. | 106/85 |

Primary Examiner—J. Poer
Attorney, Agent, or Firm—Polster and Polster

[57] ABSTRACT

A method of molding porous cores or barrier materials for filtering, drying and removing acids from refrigeration or air conditioning systems includes mixing active solid ingredients in a nominal fully activated condition with a modified phosphate binder, immediately molding the mixed "desiccant" and binder into a desired shape, ejecting the green formed unit, and drying and firing the unit.

2 Claims, No Drawings

METHOD OF MAKING MOLDED BLOCKS

CROSS REFERENCE TO RELATED APPLICATION

This application contains subject matter common to my application entitled Binder and Method of Making It, Ser. No. 586,866 filed June 16, 1975.

BACKGROUND OF THE INVENTION

This invention relates to the process for making and the composition of molded porous cores or barrier materials for filtering, drying and removing acids from refrigeration or air conditioning systems.

Previous procedures have been complicated, required separate handling equipment for adding water into a blend of desiccants, required extra labor for this material and weighing out the correct amount of hydrated desiccants to be mixed with a binder solution. Then the task of weighing the proper amount of the desiccant-binder mix took extra labor and equipment. See, for example, Figert, U.S. Pat. No. 3,025,233, column 4, line 70 et seq.

One of the objects of this invention is a simple direct method of making molded shapes from a selected number of dry desiccants and a water soluble binder that is capable of bonding the desiccants into an integral unit and then becomes insoluble in water after firing to activate the desiccants.

Another object is to provide a wide range of compositions of the molded shapes or barrier units so as to meet the diverse needs of different manufacturers and the different types of refrigeration and air conditioning systems.

SUMMARY OF THE INVENTION

In accordance with this invention, generally stated, active solid ingredients (hereinafter referred to as desiccants), in a nominal fully activated condition are mixed with a modified aluminum phosphate binder, immediately formed into a desired shape by conventional molding techniques, inspected, dried and fired to activate the desiccants.

The mixing vessel and mold parts are recycled, and the elapsed time from the dispensing of the binder and solids prior to the mixing step to the inspection of the green formed unit is less than five minutes.

DESCRIPTION OF THE PREFERRED EMBODIMENT

The process of the present invention uses desiccants as received from the supplier in a nominal fully activated condition, and a modified aluminum phosphate binder described in detail in an application filed concurrently herewith, the disclosure of which is incorporated herein by reference.

The modified aluminum phosphate binder is formed by reacting a slurry of aluminum hydroxide and one or more compounds from a group including oxides, hydroxides or carbonates of calcium, magnesium, zinc, strontium, antimony, lead, iron and cadmium with phosphoric acid in such a way as to generate sufficient heat to permit the reaction between the metal compound and the phosphoric acid to proceed to completion at or near the boiling point. The binder composition contains aluminum and one or more of the other metals in ratios of equivalents of aluminum to the other metals in the range from between about 0.70 and 2.90 and the ratios of the sums of the equivalents of all of the metals to the molar equivalent of phosphoric acid in the range from between about 1.00 and 1.80. The equivalents are determined by dividing the parts by weight of the starting ingredient by the molecular weight of the compound divided by the valence of the metal.

The amounts of desiccants such as molecular sieve, activated alumina, and activated alumina gel required to make one unit of the size and composition of filter-drier being produced are dispensed into a cup. Dispensing can be either manually or by automatic dispensing equipment. The requisite amount of binder can be dispensed into the cup previous to the dispensing of the solids, simultaneously with the dispensing of the solids, or the binder can be added to the dispensed solids contained in a cup. The sequence of bringing the desiccants and binder together has no effect on the final product. However, due to the dustiness of the desiccants it is preferred that the dry solids go into the liquid binder to minimize the amount of dust that must be controlled in other ways.

The cup containing binder and desiccants passes on to the mixer where the contents are mixed thoroughly to coat each particle of desiccant with binder. The method of mixing can be any means that will perform the required blending of binder and desiccants. However, a planetary type mixing pattern such as provided by the Hobart Manufacturing Company mixer is preferred. This unit is so mounted as to be fully automated except for placing the mix cups on and taking them off the mixer.

The mixture of desiccant and binder is immediately formed into the desired shape by conventional molding techniques. The mold parts are recycled to be used again and the green formed unit placed on a conveyor for inspection before going to the drying and firing operation. The cup is also recycled back to the dispensing operation. Elapsed time from the start of the dispensing to a final formed unit does not exceed five minutes although production rates can be much higher with units being dispensed, mixed, molded and molds being removed all at the same time.

There is, apparently, no limitation on the quantities, forms and varieties of materials that can be mixed and molded by this method except for economic and other considerations such as flow capacity and filtration performance in addition to the main function of water and acids removal.

The following examples exemplify the various compositions that may be used to form an integral porous molded shape by the above disclosed method. Activated alumina may be Alcoa F-1, Reynolds RA-1, or any other material with the same characteristics.

EXAMPLE I

Dispense 630 grams of Alcoa F-1 activated alumina and 35 grams of Linde crystalline zeolite molecular sieve and 400 grams of modified aluminum phosphate binder containing about 50% water. Mix for a period of thirty seconds, then place immediately in the mold, press, and eject. Inspect, dry and fire at 630° F. to remove water from the desiccants and properly set the binder.

The procedure set forth in Example I may be used to form molded units by using the proper amount of binder for the following amounts of desiccants, in which the active alumina gel may be Alcoa H-151, H-51 or material with the same characteristics.

| EXAMPLE II | Parts by weight |
| --- | --- |
| Activated alumina | 94.0 |
| Crystalline zeolite molecular sieve | 6.0 |
| EXAMPLE III | |
| Activated alumina | 50.0 |
| Activated alumina gel | 35.0 |
| Crystalline zeolite molecular sieve | 15.0 |
| EXAMPLE IV | |
| Activated alumina | 25.0 |
| Activated alumina gel | 65.0 |
| Crystalline zeolite molecular sieve | 10.0 |
| EXAMPLE V | |
| Activated alumina | 35.0 |
| Activated alumina gel | 20.0 |
| Crystalline zeolite molecular sieve | 45.0 |
| EXAMPLE VI | |
| Activated alumina gel | 80.0 |
| Crystalline zeolite molecular sieve | 20.0 |

The foregoing has been given for clearness of understanding only and no unnecessary limitations should be inferred from them, as obvious modifications can be made by anyone skilled in the art.

Having thus described the invention, what is claimed and desired to be secured by Letters Patent is:

1. A molded porous shape for use as a core for filtering, drying and removing acids from refrigeration systems and the like comprising at least one solid particulate desiccant taken from the group consisting of crystalline zeolite molecular sieve, activated alumina, and activated alumina gel, the type and amount of desiccants being determined by the desired water and acid capacity of the core, and a modified aluminum phosphate binder comprising the reaction product of phosphoric acid and aluminum hydroxide plus at least one of a group consisting of oxides and hydroxides of calcium, magnesium, zinc, strontium, antimony, lead, iron and cadmium, said binder containing a ratio of equivalents of aluminum to the said other metals in the range of 0.70 – 2.90 to 1, and a ratio of total metal equivalents to mole equivalents of phosphoric acid in the range of 1.00 – 1.80 to 1.

2. A process for making porous molded shapes for use as cores for filtering, drying and removing acids from refrigeration systems, which comprises mixing nominally fully activated desiccant taken from the group consisting of crystalline zeolite molecular sieve, activated alumina, and activated alumina gel, with an aqueous solution of a modified aluminum phosphate binder, said binder being the product of the controlled reaction of phosphoric acid and an aqueous slurry containing aluminum hydroxide plus at least one of a group consisting of oxides and hydroxides of calcium, magnesium, zinc, strontium, antimony, lead, iron and cadmium, said binder containing a ratio of equivalents of aluminum to the said other metals in the range of 0.70 – 2.90 to 1, and a ratio of total metal equivalents to mole equivalents of phosphoric acid in the range of 1.00 – 1.80 to 1, molding the mixture to form a green shape, and thereafter firing the shape to activate the desiccants of said molded porous shape.

* * * * *